April 18, 1950 J. W. JUVINALL ET AL 2,504,842
GLASSWORKING APPARATUS
Filed April 7, 1943 2 Sheets-Sheet 1
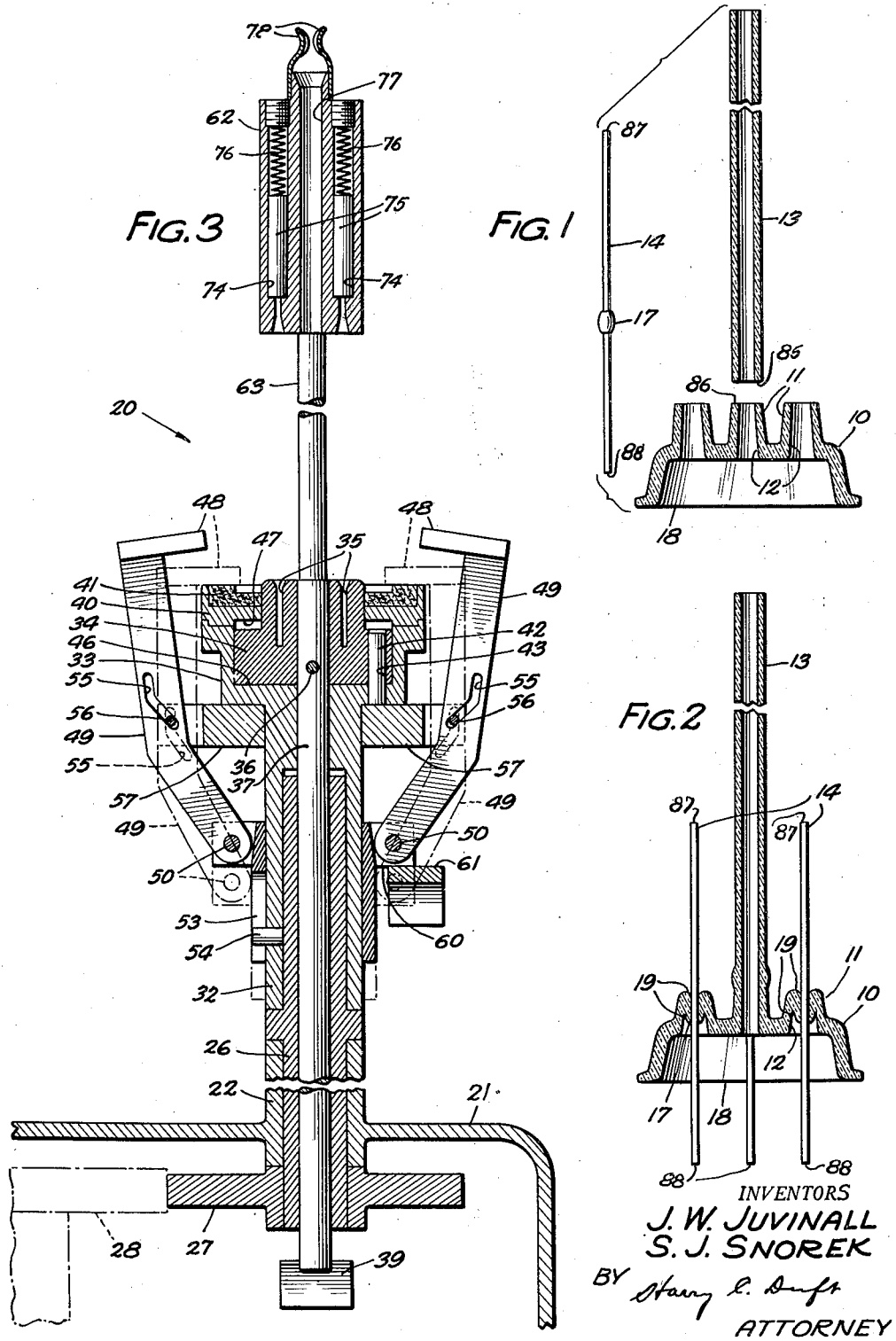
INVENTORS
J. W. JUVINALL
S. J. SNOREK
BY Harry E. Duft
ATTORNEY

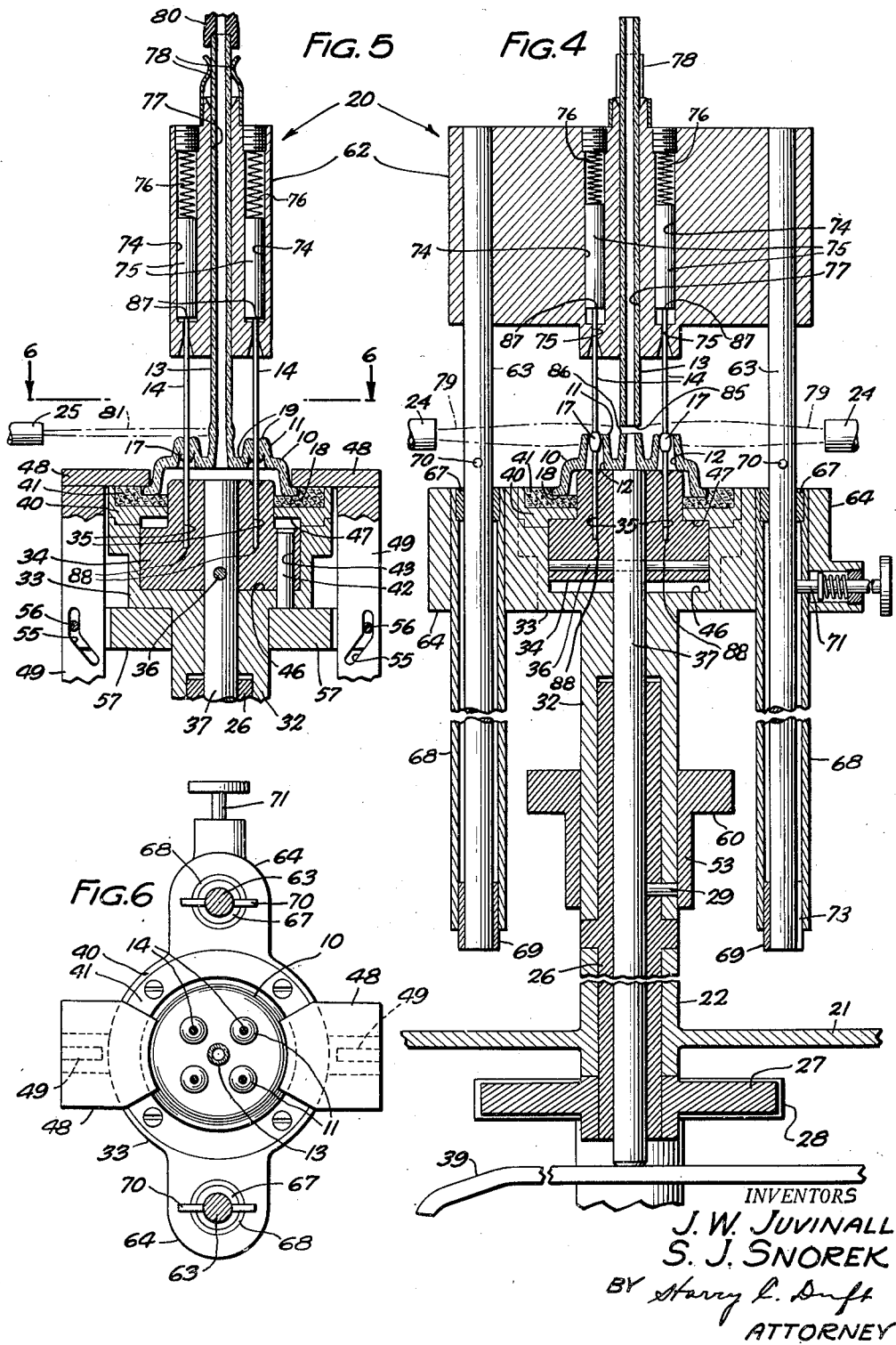

Patented Apr. 18, 1950

2,504,842

UNITED STATES PATENT OFFICE 2,504,842

GLASSWORKING APPARATUS

James W. Juvinall, La Grange Park, and Stanley J. Snorek, Berwyn, Ill., assignors to Western Electric Company, Incorporated, New York, N. Y., a corporation of New York Application April 7, 1943, Serial No. 482,078

4 Claims. (Cl. 49—2)

This invention relates to glass working apparatus and more particularly to an apparatus for aligning and sealing lead-in wires to glass stem heads for vacuum tubes and attaching glass stems thereto.

An object of the invention is the provision of an apparatus for accurately and expeditiously aligning and sealing the heretofore mentioned wires and stems to glass stem heads for vacuum tubes.

In accordance with the above object, this invention contemplates, in one embodiment thereof, an apparatus by means of which glass beaded lead-in wires are aligned with a glass stem head for a vacuum tube, and the glass is fused to adhere to the glass beaded wires, after which, and while the glass is still plastic, the wires are moved downwardly by plungers to draw and shape the surrounding glass around the wires to provide a seal therebetween and strengthening the glass to minimize cracking thereof and simultaneously fuse a stem to the head.

Other objects and advantages of the invention will be apparent from the following detailed description taken in conjunction with the accompanying drawings, in which Fig. 1 is a fragmentary view in disconnected relation of vacuum tube parts to be assembled, fused and sealed in the use of the apparatus embodying the invention, the glass parts being shown in vertical section and one of the lead-in wires being shown in elevation;

Fig. 2 is a vertical section of the finished vacuum tube assemblage after removal from the apparatus;

Fig. 3 is a fragmentary vertical central section of the apparatus of this invention shown mounted on an intermittently rotatable carrier of an automatic machine, the carrier being shown fragmentarily and the apparatus in position for loading the parts to be fused and sealed;

Fig. 4 is a similar view of the apparatus taken at right angles to that shown in Fig. 3, certain parts being in different positions and the parts to be assembled mounted thereon;

Fig. 5 is a fragmentary view similar to Fig. 3 showing the relation of the parts of the apparatus upon completion of the fusing and sealing operations; and Fig. 6 is a plan section taken on the line 6—6 of Fig. 5.

Although not limited thereto, apparatus embodying the features of the invention may be employed to advantage for aligning, fusing and sealing glass parts of an assemblage used in a vacuum tube. As shown in Fig. 1, such an assemblage may comprise an inverted cup-like glass stem head 10 provided with five nipple-like projections 11, having apertures 12 extending therethrough, on its upper face (Figs. 1 and 6). To the center projection 11 is fused a tubular glass stem 13. Entered in each of the apertures 12 arranged around the center aperture is a lead-in wire or conductor 14 having secured thereto intermediate its length a glass bead 17 of such diameter that it may freely enter the aperture 12. To complete the assemblage, the glass beads 17 and the surrounding glass walls of the apertures 12 are fused together after first accurately positioning the beaded wires along the apertures and supporting them perpendicularly to a lower annular face 18 of the stem head. While the fused glass is still plastic, the wires 14 are moved slightly downwardly which serves to draw the upper ends of the plastic glass bead projections 11 inwardly and downwardly to produce the proper curvature or shape to the fused glass at the upper as well as at the lower ends of the plastic glass beads 17 surrounding the wires, producing a desired seal between the parts and strengthening the glass and reducing any tendency thereof to crack, as clearly indicated at 19 in Figs. 2 and 5, which illustrates the completed assemblage.

Referring to the drawings in detail and particularly to Figs. 3 and 4, the disclosed embodiment of the invention, indicated in general at 20, is preferably mounted on an intermittently operated automatic machine, which is basically a Charles Eisler type stem-making machine, such as is disclosed in United States Patent No. 2,063,235 to Charles Eisler, dated December 8, 1936, which includes a rotatable turret or carrier 21, shown fragmentarily, carrying a plurality of circularly arranged devices 20, only one of which is illustrated, rotatably mounted in bearings 22 adjacent the periphery of the carrier. Any suitable mechanism (not shown) may be provided for effecting an intermittent rotary motion to the carrier 21, whereby the several devices 20 are advanced, step by step, past operators located at certain positions around the carrier to load the parts 10, 13 and 14 on the device, remove the completed assemblage therefrom, manipulate gas burners 24 and 25 (Figs. 4 and 5) to fuse the glass parts and perform other operations which will be described hereinafter. Mechanism is also included in the machine whereby during the intermittent advance of the devices 20 with the carrier 21 and during each dwell period except at a single loading station, the devices are continuously rotated about their own axis.

The details of the referred-to mechanisms of the machine on which the devices 20 are mounted have been omitted from this disclosure for the sake of simplicity, since a full disclosure thereof is not essetnial to a complete understanding of the present invention.

Each of the devices 20, only one of which is shown in Figs. 3 to 6, inclusive, comprises a shouldered non-reciprocatory supporting sleeve 26 rotatably journalled in the bearing 22 and carrying at its lower end a friction gear 27, which is suitably fixed thereto. The gear 27 meshes with a driving friction gear 28, shown fragmentarily in broken outline in Figs. 3 and 4. In the arrangement which is well-known in the referred-to Charles Eisler type of stem-making machine, a gear 28 is provided at each station except the unloading and loading station, where no rotation of the devices 20 takes place. The gears 28 are constantly driven in the operation of the machine and thus each device 20 will be constantly rotated at each station through the gears 28 and 27 except at the unloading and loading stations and during the intervals between stations while being indexed. Fixed for rotation to the sleeve 26, as indicated at 29 (Fig. 4), is a non-reciprocatory surrounding sleeve 32 having a cup-shaped head 33 at its upper end, in which is slidably fitted for a limited vertical movement, a cylindrical shouldered member 34 having four vertical apertures 35 for snugly receiving the lower ends of the four lead-in wires 14 of the assemblage. The member 34 is pinned at 26 to a central actuating rod 37, which extends through the sleeves 26 and 32 and to a point below the gear 27, where it engages a cam face 39 of a stationary ring-shaped cam. The arrangement is such that during the bodily rotation of the device 20 with the rotating carrier 21 and at a certain point in each rotation thereof, the rod 37 and member 34 are elevated slightly to the position shown in Fig. 4 and thereafter permitted to fall back by gravity to the position shown in Fig. 5. Fixed to the upper face of the rotatable non-reciprocatory cup-shaped head 33 is an annular shouldered member 40, upon which is supported an annular seat 41 of asbestos lumber having a depressed upper face upon which the glass stem head 10 is placed (Fig. 4). In addition to its reciprocatory movement, the member 34 is connected for rotation with the head 33 by a pin 42 fixed to the head and slidably fitted in an aperture 43 in the member 34. In its lower position (Fig. 5), the member 34 rests upon a face 46 of the head 33 and in its upper position it abuts an annular face 47 of the member 40 (Figs. 3 and 4).

The glass stem head 10 is clamped to the seat 41 by a pair of diametrically opposite rockable fingers 48 (Figs. 3, 5 and 6) fixed to the upper ends of angular shaped members 49 pivoted at their lower ends, as indicated at 50, to slotted portions of a flanged collar 53 connected to the rotary non-reciprocatory sleeve 32 by a pin and slot connection 54, whereby the collar may slide up and down on the sleeve simultaneously with its rotation therewith. Intermediate their ends, the members 49 are formed with cam slots 55, through which extend pins 56 carried in diametrically arranged slotted supports 57, through the slots of which extend the members 49, the supports being fixed to the sleeve 32. In the bodily rotation of the device 20, with the rotating carrier 21, after the glass stem head 10 has been mounted on the face 42 of the seat 41 at the loading station and during rotation about its own axis through the gears 28 and 27, a lower annular face 60 of the collar 53 rides off a stationary cam face 61 (Fig. 3), which permits the collar to move downwardly on the sleeve 32 by gravity. During this movement of the collar 53, the connected members 49 carrying the clamping fingers 48 are moved downward and inward by the cooperating cam slots 55 and pins 56 from the full line positions to the broken outline positions (Fig. 3). In this last position, as shown in Fig. 5, wherein the stem head 10 is shown on its seat 41, the fingers are engaged over an annular face of the head to hold the latter upon its seat. In another position of the device 20 as it nears the loading station, the face 60 of the collar 53 rides up the stationary cam face 61 and the head clamping fingers 48 are moved upwardly and outwardly to release the completed assemblage for removal from the device.

Vertically reciprocable above the head 33 is a plunger carrying block 62 fixed to a pair of guide rods 63 slidable in diametrically formed extensions 64 integral with the head 33 (Figs. 4 and 6). Each of the rods 63 is guided in the extension 64 by a bearing sleeve 67 secured in a surrounding relatively long shouldered sleeve 68 fixed at its upper end in the extension. Secured to the lower end of the rod 63 is a guide bearing 69, which is arranged to slide in the bore of the sleeve 68. In the extreme lowered position (not shown) of the block 62, it is supported by pins 70 carried by the rods 63 and engaging the upper faces of the head extensions 64. At the loading position, the block 62 is manually elevated to a position somewhat higher than that shown in Fig. 3 and is held in such position by a spring pressed detent 71 (Figs. 4 and 6) supported in the head extension 64. The detent 71 is arranged to spring into retaining position under the associated rod 63, as the lower end of the rod moves therepast, the guide bearing 69 on the rod being formed with a slot 73, which permits the bearing to pass the detent.

Formed in the block 62, which is arranged to rotate with the member 34, are four shouldered apertures 74, which are in accurate fixed alignment at all times with the apertures 35 of the member 34. The lower portions of the apertures 74 have a diameter similar to the apertures 35 and are flared at their entrance ends to receive and guide the upper ends of the lead-in wires 14 (Figs. 4 and 5). Carried in each of the block apertures 74 is a plunger 75, which is constantly urged to its lowermost position by a spiral spring 76 (Fig. 3), the position of the plungers varying, as clearly shown in Figs. 4 and 5, with different positions of the member 34, which will be referred to hereinafter. Also formed in the block 62 is a central aperture 77, which is in alignment with the axis of rotation of the member 34 and head 33 and, therefore, of the glass stem head 10 and its center apertured projection 11. The aperture 77 is adapted to freely receive the tubular glass stem 13 manually inserted thereinto at the loading station and is frictionally supported in an initial position with its lower end face spaced a suitable distance from the upper face of the center projection 11 of the glass stem head 10, as shown in Fig. 4. Opposed leaf springs 78 attached to an upper circular reduced portion of the block 62 serve to frictionally hold the stem 13 in its set position in the aperture.

77 of the block 62 until it is moved manually downward in another position of the device 20 to abut its lower end face 85 with the upper face 86 of the center projection 11 of the stem head 10 (Fig. 5).

In the use of the device 20 embodying the invention on an intermittently operated automatic machine of the type referred to hereinbefore, each device dwells at the loading station for a predetermined period during which no rotation thereof occurs, as hereinbefore described, and the operator removes the completed assemblage and at this time the device appears as shown in Fig. 3. At all other stations, the device is rotating about its own axis. Immediately thereafter, the operator inserts the four lead-in wires 14 into the apertures 35 of the member 34 with the shorter length of the wires below the glass beads 17 lowermost. Then the glass stem head 10 is mounted on its seat 41, the wires 14 being threaded through the apertures 12 of the head projections 11 with the glass beads 17 positioned adjacent the lower ends of the apertures. A tubular glass stem 13 is then inserted in the aperture 77 of the plunger block 62 and the head is released by withdrawing the detent 71 and it moves downwardly until the fixedly aligned plungers 75 engage the upper end faces 87 of the wires 14. In this described position of the head 62, the spring-pressed plungers 75 are urged upwardly in the head and the lower end faces 88 of the wires 14 are individually maintained against the bottom wall of its aperture 35 in the member 34, thus accurately locating the lower ends thereof in alignment while the positions of the plungers may vary due to slightly different lengths of the wires 14 above the beads 17. It will be understood that with the plungers 75 bearing against the upper end faces 87 of the wires 14, the entire weight of the head 62 and the attached guide rods 63 and cooperating parts are yieldably supported on the wires through the springs 76 associated with the plungers 75. The operator then moves the glass stem downwardly until its lower end face 85 is spaced a suitable distance from the upper face 86 of the center head projection 11 (Fig. 4.)

Upon the termination of the dwell period of the machine, the carrier 21 is automatically indexed to advance each device 20 to the next station whereat through the gears 27 and 28 each of the devices 20 rotates about its own axis. When the device 20 leaves the loading station and before it reaches a series of low intensity gas flames 79 (Fig. 4) located at the next station, the face 60 of the collar 53 rides down the stationary cam face 61 and in the manner previously described, the clamping fingers 48 are moved inwardly and downwardly to clamp the glass stem head 10 on its seat 41, to the position shown in broken outline in Fig. 3 and in full lines in Fig. 5. Also, the lower end face of the rod 37 rides up the stationary cam face 39, which elevates the member 34, and the wires 14, with the glass beads 17, are elevated to the position shown in Fig. 4, the glass stem head 10 remaining stationary. In addition to the gas flames 79, other gas flames (not shown) of higher intensity are arranged at different stations and in which each loaded device 20 rotates during its dwell period. The gas flames are effective to gradually heat and soften the glass of the projections 11 of the stem head 10 and the glass beads 17 on the wires 14 until they melt and fuse, the flames also being arranged to play upon the lower end of the glass stem 13. At one of the stations following the operation of the device, as shown in Fig. 4, at which time the glass parts are sufficiently molten, an operator slides the glass stem 13 downwardly to abut the lower end face 85 thereof with the upper end face 86 of the center head projection 11 and connects a rubber tube 80 communicating with a suitable source of air pressure (not shown) to the upper end of the stem 13. Following this, the operator directs a pencil type flame 81 (Fig. 5) of high intensity against the abutted portions of the stem 13 and projection 11 to fuse the stem to its head 10. The air pressure directed into the stem 13 through the tube 80 serves to prevent collapse of the hollow stem 13 and projection 11 during the fusing operation. Upon fusing the stem 13 to the head 11, the tube 80 is disconnected from the stem and the flame 81 is withdrawn. Upon the device moving from this last station, and while the glass of the fused head projection 11 and the beads 17 on the wires 14 are still molten and plastic, the rod 37 rides down the stationary cam face 39. The member 34 supporting the wires 14 is thus lowered to the position shown in Fig. 5 and this movement permits the reciprocatory head 62 carrying the spring pressed plungers 75 pressing upon the wires 14 to move them downwardly a slight distance, following the movement of the member 34, relative to the stationary stem head 10. This movement of the wires 14 serves to draw and shape the surrounding plastic glass of the projections 11 and the beads 17 around the wires to provide the desired seal and to strengthen the fused glass and thereby minimizing any tendency thereof to crack, as hereinbefore described and indicated at 19 (Figs. 2 and 5). As the device 20 with the completed assemblage nears the loading station, the face 60 of the collar 53 rides up the stationary cam face 61 and the clamping fingers 48 are moved upwardly and outwardly to release the completed assemblage from its seat 41. Upon the device 20 dwelling at the loading station, the operator, with one hand, slides the plunger carrying block 62 upwardly until the detent 71 springs under its associated rod 63 and with the other hand removes the completed assemblage from its seat 41, the device now appearing as shown in Fig. 3. The operator now proceeds to reload the device and the described cycle of operation is repeated.

It will be understood that the embodiment herein described is merely illustrative of the invention and one application thereof and that modifications can be made and it is capable of other applications.

What is claimed is:

1. In a glass working apparatus having a glass fusing heater, the combination of rotary means for supporting and rotating an apertured glass article for receiving an element having fixed thereon a glass annulus to be fused and sealed to the wall of the aperture, a reciprocatory member rotatable with said supporting means and article for supporting the element on one of its end faces with the element positioned so that the annulus is predeterminedly initially positioned along the aperture, and means including a spring pressed plunger for engaging the opposite end face of the element for causing movement of the element relative to the article supporting means in another position of the member while the fused glass is plastic to draw and shape the glass around the element to provide a seal therebetween and strengthening the fused glass to minimize cracking thereof, and means for rotating said article supporting means, plunger and reciprocatory member.

2. In a glass working apparatus having a rotary carrier and a glass fusing heater, the combination of rotary means journalled on the carrier for supporting and rotating an apertured glass article for receiving an element having fixed thereon a glass annulus to be fused and sealed to the wall of the aperture, clamping members pivotally mounted on said article supporting means for holding the article on said supporting means, a reciprocatory member rotatable with said supporting means and article for supporting the element on one of its end faces so that the annulus is predeterminedly initially positioned along the aperture in one position of said member, means including a spring-pressed plunger mounted on the article supporting means for engaging the opposite end face of the element for causing movement of said element to another position relative to the article supporting means in another position of the member while the fused glass is plastic to draw and shape the glass around the element to provide a seal therebetween and strengthening the fused glass to minimize cracking thereof, means for rotating said article supporting means, plunger and reciprocatory member in unison, a stationary cam, a slidable member operatively connected to said clamping members and engageable with said cam for periodically effecting movement of said clamping members for holding and releasing the article during rotation of the carrier, a second stationary cam effective to control the movement of said reciprocatory member in timed relation with the movement of said clamping members during movement of the carrier.

3. In a glass working apparatus having a glass fusing heater, the combination of means for supporting a glass article having apertures each adapted to receive an element having fixed thereon a glass annulus to be fused and sealed to the wall of the aperture, a reciprocatory member for supporting said elements on their lower end faces with the annuli in the apertures in one position of said member, a slidable head having apertures aligned with the apertures in the glass article for guiding, receiving and supporting upper ends of the elements, spring pressed plungers in said head apertures arranged to individually engage upper end faces of the elements and upon which the weight of said head bears for longitudinally locating the elements in the reciprocatory member, and an abutment operatively associated with said member for maintaining it in said one position and upon relative displacement therefrom permitting movement of said member by the action of gravity relative to the article supporting means while the fused glass is plastic to permit said slidable head to move downwardly by the action of gravity and thereby cause movement of said elements relative to the article to draw and shape the glass around the elements to provide a seal therebetween and strengthening the fused glass to minimize cracking thereof.

4. In a glass working apparatus having a glass fusing heater, the combination of means for supporting a glass article having an apertured projection to which is to be fused an aligned lower end face of a tubular glass stem and having apertures each adapted to receive an element having fixed thereupon a glass annulus to be fused and sealed to the wall of its aperture, a reciprocatory member for supporting said elements on their lower end faces with the annuli in the apertures in one position of said member, a slidable head having an aperture aligned with the article projection for receiving the glass stem and having apertures for guiding, receiving and supporting upper ends of the elements, spring-pressed plungers in each of said latter apertures arranged to individually engage upper end faces of the elements and upon which the weight of said head bears for constantly maintaining the elements supported on their lower end faces on the reciprocatory member, means carried by said head for frictionally slidably supporting the glass stem, and an abutment operatively associated with said member for maintaining it in said one position and upon relative displacement therefrom permitting movement of said member by the action of gravity relative to the article supporting means while the fused glass is plastic to permit said slidable head to move downwardly by the action of gravity and thereby cause movement of said elements relative to the article and its stem to draw and shape the glass around the elements to provide a seal therebetween and strengthening the formed glass to minimize cracking thereof.

JAMES W. JUVINALL.
STANLEY J. SNOREK.

REFERENCES CITED

The following references are of record in the file of this patent:

UNITED STATES PATENTS

| Number | Name | Date |
|---|---|---|
| 1,004,072 | Pierson | Sept. 26, 1911 |
| 1,432,926 | Thronsen | Oct. 24, 1922 |
| 2,107,254 | Horn | Feb. 1, 1938 |
| 2,190,788 | Horn | Feb. 20, 1940 |
| 2,195,483 | Franke | Apr. 2, 1940 |
| 2,220,741 | Thorson | Nov. 5, 1940 |
| 2,242,774 | Brumley | May 20, 1941 |
| 2,252,195 | Niles | Apr. 12, 1941 |
| 2,288,537 | Mallory | June 30, 1942 |
| 2,296,347 | Hinkley et al. | Sept. 22, 1942 |
| 2,312,003 | Schneider et al. | Feb. 23, 1943 |
| 2,321,224 | Madden et al. | June 8, 1943 |
| 2,321,600 | Horn | June 15, 1943 |